United States Patent Office 3,253,754
Patented May 31, 1966

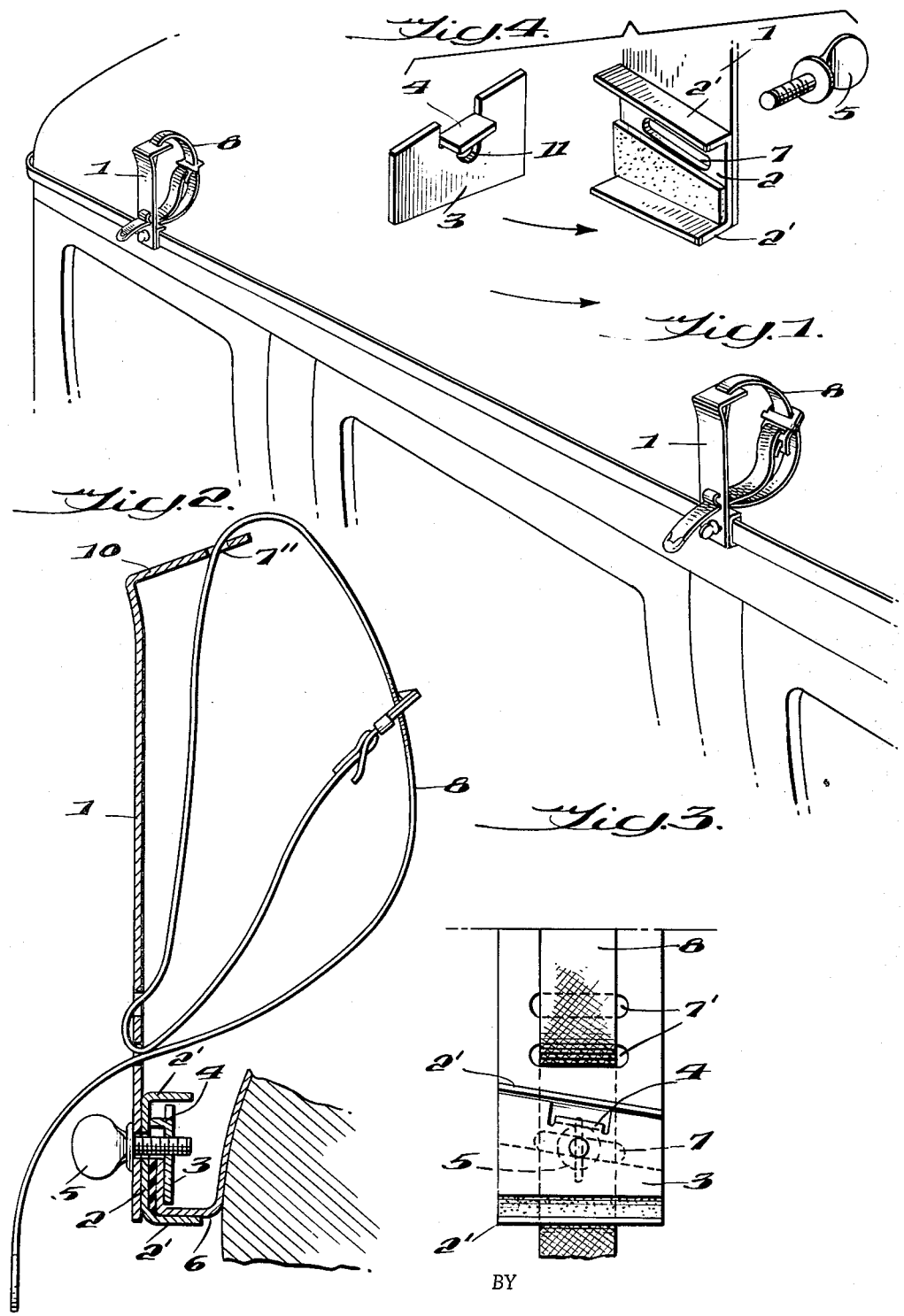

3,253,754
AUTOMOBILE CARRIER ATTACHMENT
Emil V. Gualano, 107 N. Hillview Ave.,
Los Angeles, Calif.
Filed May 15, 1964, Ser. No. 367,774
10 Claims. (Cl. 224—42.1)

This invention relates to automobile roof-top carrier attachments and more particularly to carrier elements attachable to the peripheral rain gutter of an automobile roof.

Articles such as fishing poles, water skis, snow skis, pipe, lumber, Venetian blinds and the like, characteristically are too elongate for easy insertion within an automobile and have always presented a problem in their transport by automobile. Many techniques have been employed for securing such devices, but most of these have involved elaborate equipment and have lacked simplicity and the feature of quick and easy attachment. There are many automobiles, moreover, such as the so-called hard top sedan or coupe, that have no door post and therefore nothing in the way of a suitable base for the type of attachment customarily found on the market.

Most automobiles, and particularly those of the sedan type, customarily have a rain gutter extending at least along the sides of the roof top and just above the door frame. The present invention takes advantage of the molding forming this rain gutter to provide a simple means of supporting or carrying articles as mentioned above, outside of the automobile.

It is an object of this invention to provide a quick, easy means for securing elongate items to an automobile.

A further object is to provide a carrier element which attaches to the car with the utmost simplicity and which requires but a few simple light components.

Still another object is to provide a carrier element which attaches to the car through the medium of the molding forming the peripheral rain gutter on the car roof.

Still further objects will become apparent from the description following and the claims appended thereto.

According to the present invention there is provided a carrier element which is adapted to be mounted on the rain gutter of an automobile. While it is recognized that carrier devices of this general type have been designed heretofore, the present type of carrier provides many advantages. The carrier includes a bracket which extends above the gutter, the upper end portion of the bracket providing supporting means for the articles being carried, the lower end portion of the bracket having novel clamping means to engage the rain gutter of an automobile. The clamp member which is generally U-shaped is engaged about the gutter with one leg extending above the gutter and the other leg extending below the gutter, the upper leg portion being spaced above the upper edge of the rain gutter. The upper leg portion of the clamp member does not extend parallel to the lower leg portion along the length of the rain gutter, but is angularly disposed so that the clamp member is wedge shaped. There is provided, a wedge-shaped insert but of width narrower than the U channel of the clamp member. Means are provided for tightening the wedge-shaped insert up against the inside of the rain gutter so as to clamp the lower surface of the rain gutter securely against the lower leg portion of the clamp member, and secure the bight portion of the clamp against the side edge of the rain gutter thereby securing the carrier element with the bracket member in a vertical position.

The bracket member has at its free end, a bent portion. Means are provided for securing a strap to the bracket member near the clamp member and passing it through the bent portion of the bracket member, thereby making it possible to strap the carried article to the carrier element.

The invention will be better understood when reference is made to the accompanying drawings. A preferred embodiment is illustrated in the drawings.

FIG. 1 is a perspective view of the carrier elements in use,
FIG. 2 is a side sectional view of the preferred embodiment of my invention,
FIG. 3 is a front view portion of the same, and
FIG. 4 is an exploded perspective of the portion shown in FIG. 3.

Referring to the figures, it will be seen that the carrier element comprises a U-shaped clamp member 2 and an L-shaped bracket member 1. The longitudinal axis of the bracket member 1 extends generally substantially perpendicular with respect to the clamp leg portions 2'. On the other hand, bent portion 10 of the bracket 1 extends along a longitudinal axis essentially parallel to that of the leg portions of the clamp member 2. Some means such as a weld is used to join the end of the bracket member 1 to the back of the U channel of the clamp member 2. Understandably, the two members could be formed as a single, integral member, but the element can be produced more readily and more cheaply, according to the preferred embodiment, in the form of the two members joined in the above fashion. As shown in FIGS. 3 and 4, the clamp member 2 is wedge shaped, as the upper leg portion is non-parallel to the lower leg portion. In the U channel of the clamp member 2, there is provided an aperture 7 which extends through the clamp member and bracket member and extends in length over most of the width of the combination. The elongated aperture 7 is parallel to the upper leg portion of the clamp member 2. Furthermore, there is a wedge-shaped element 3 of the same shape as the U channel of the clamp member 2 but somewhat narrower. At the center of the inclined edge of the wedge-shaped element 3 there is a cut-out portion 4 which is bent perpendicular to the plane of the wedge-shaped element 3. Below the tab 4 is a threaded hole 11. A threaded bolt 5 is provided which is insertable through the elongated aperture 7 and engageable with the threaded hole 11.

Through the bracket member 1, and located near the upper leg portion of the clamp member 2, are two closely spaced apertures 7', centered on the longitudinal axis of the bracket member 1, and perpendicular to the sides of the bracket member. A similar aperture 7" is located in the leg portion 10 of the L-shaped bracket member 1. Each of the apertures 7' and 7" is preferably in the form of a slot through which the strap 8 is passed for purposes of securing the elongate articles to the bracket 1. The strap may be passed fully around the articles or may be passed over the articles alone, and furthermore is preferably adjustable through its own clamping means.

Operationally, as seen by FIGS. 1 and 2, the clamp member 2 is positioned over the rain gutter 6 with the lower leg portion of the clamp member against the underside of the gutter. It can be seen in FIG. 2 that there is provided a padding on the inside face of the clamp member which serves to protect the surface of the rain gutter from marring. The bolt 5 is passed through the aperture 7 and engaged with the matching threaded hole 11 in the wedge-shaped element 3. Before tightening the bolt 5, the bolt with the wedge-shaped element attached is slid down the aperture until the bottom edge of the wedge-shaped element is in contact with the inside surface of the rain gutter. The rain gutter is thereby tightly gripped between the bottom edge of the wedge-shaped element and the bottom leg portion of the clamp member 2. A tightening of the bolt 5 draws the wedge-shaped element 3 toward the inside surface of the U channel of the clamp member 2 until the edge of the tab 4 engages the surface of the clamp member. Further tightening of the bolt 5 draws the bottom edge of the wedge-shaped element tightly against the inside of the lip portion of the rain gutter, thereby securing the carrier element in position. It should be understood that the tab 4 may be eliminated, and that tightening of the bolt 5 will then merely draw the whole wedge-shaped element against the inside of the lip of the rain gutter.

It is much to be preferred, of course, that the leg portions 2′ of the clamp member 2 be of such a thickness that the element may fit between the bottom of the rain gutter and upper edge of the door frame, in order that there be no obstruction when the door is opened. The use of 12 gauge cold rolled steel for the leg portions 2′ of the clamp 2 and for the bracket member 1, with the bent portion 10 of the bracket flanged inward in substantially a horizontal plane, has provided the most desirable commercial arrangement.

With the clamp secured to the rain gutter, and the bracket member 1 in a substantially vertical position, the strap 8 may be used in conjunction with the slots 7′ and 7″ to secure the elongate articles to the carrier element, as is done to the other of the pair of elements ordinarily required for transporting the articles.

It can be seen that the presently disclosed carrier supports articles above the roof of an automobile in such a manner that they do not project horizontally from the automobile. Furthermore, the articles are supported on brackets extending directly up from the rain gutter so that there is less tendency to twist or distort the gutter. The clamping means provides for ready engagement of the bracket with the rain gutter and the wedge element assures a firm gripping action.

Although the invention has been described in considerable detail with reference to certain preferred embodiments thereof, it will be understood that variations and modifications can be effected without departing from the scope and spirit of the invention as described hereinabove and as defined in the appended claims.

I claim:

1. A carrier element for attachment to the peripheral gutter of an automobile roof comprising a U-shaped clamp member, said U-shaped clamp member comprising upper and lower legs and an interconnecting channel portion, an L-shaped carrier bracket member comprising a stem portion and a leg portion, said leg portion extending substantially normally from one end of said stem portion, and the other end of said stem portion being secured to the channel portion of said U-shaped clamp member, an aperture, said aperture extending through the channel portion of said clamp member and through the stem portion of said bracket member, and said aperture being elongate in shape and extending over a substantial portion of the width of said stem portion, a clamping element, said clamping element being of the same shape as the U channel of said U-shaped clamp member but of a width slightly and uniformly less than the distance between the legs of said clamp member and positioned therebetween, means for drawing said clamping element toward the U channel and tightly against the inside surfaces of the lip and bottom portions of the gutter whereby the gutter is engaged with said clamp member such that its lip portion is adjacent the U channel of said clamp member and its underside is adjacent said lower leg of said clamp member, and said means for drawing said clamping element toward the U channel comprising a threaded bolt member passed through said aperture and engageable with a like-threaded hole in said clamping member, and strap means extending through apertures in the stem portion of said bracket member and said leg portion of said bracket member whereby elongated articles may be supported by said bracket member and retained by said strap means in spaced relation to the roof of the automobile.

2. A carrier element according to claim 1 wherein said clamping element has a tab portion cut away from its edge, said tab portion being bent at a substantially right angle to the inside surface of said clamping element such that the free end of said tab portion may contact the surface of said U channel to hold said clamping element away from said U channel, and wherein said carrier element further comprises padding means, said padding means being secured to that portion of the U channel and said lower leg of said clamp member engageable with the outside surface of said gutter to prevent marring of the finish thereof.

3. A carrier element according to claim 1 wherein said upper and lower legs of said clamp members lie in planes not parallel in one dimension only, such that said clamp member is wedge-shaped, and wherein said clamping element is correspondingly wedge-shaped with its tapered edge corresponding to the upper leg of said clamp member.

4. A carrier element according to claim 3 wherein said elongated aperture is parallel to the upper leg of said clamp member such that said clamping element, being of less width than said U channnel, may be moved a distance equal to the length of said aperture with said bolt member attached, thereby adjusting the space between the bottom edge of said clamping element and the lower leg of said clamp member to accommodate gutters having bottom portions of different thicknesses, the top edge of said clamping element being in slideable contact with the upper leg of said clamp member to assure rigidity when said bolt member is tightened, said carrier element thereby being secured to said gutter with its bracket member extending vertically upward.

5. A carrier element for attachment to the peripheral gutter of an automobile roof comprising a U-shaped clamp member, said U-shaped clamp member comprising upper and lower legs extending above and beneath the peripheral gutter respectively, said lower leg being adjacent the bottom of the gutter, and an interconnecting channel portion adjacent the lip of the gutter, a carrier bracket member secured to the said channel portion of the U-shaped clamp member and extending upwardly therefrom, an aperture extending through the said channel portion, a clamping element positioned between the leg of the U-shaped clamp member, and having its upper edge positioned substantially adjacent the said upper leg, said clamping element being of the same shape as the said channel portion of the U-shaped clamp member but of a width slightly and uniformly less than the distance between the legs of said clamp member and positioned therebetween, said channel portion being wedge shaped, said upper leg being inclined upwardly from the axis of the U-shaped member, the said upper edge of the clamping element which is positioned substantially adjacent the said upper leg also being upwardly inclined, and the said aperture being elongated and upwardly inclined, the elongation being substantially parallel to the said inclined upper leg, means extending through the said aperture and engaging the said clamping element for drawing said clamping element towards the said channel portion and against the inside surface of the lip of the gutter.

6. A carrier element for attachment to the peripheral gutter of an automobile roof comprising a U-shaped clamp member, said U-shaped clamp member comprising upper and lower legs extending above and beneath the peripheral gutter respectively, said lower leg being adjacent the bottom of the gutter, and an interconnecting channel portion adjacent the lip of the gutter, a carrier bracket member secured to the said channel portion of the U-shaped clamp member and extending upwardly therefrom, said carrier bracket including a stem, said stem having apertures, and a strap means extending through the apertures whereby elongated articles may be supported by said bracket and strap means, an aperture extending through the said channel portion, a clamping element positioned between the legs of the U-shaped clamp member, and having its upper edge positioned substantially adjacent the said upper leg, said clamping element being of the same shape as the said channel portion of the U-shaped clamp member but of a width slightly and uniformly less than the distance between the legs of said clamp member and positioned therebetween, means extending through the said aperture and engaging the said clamping element for drawing said clamping element towards the said channel portion and against the inside surface of the lip of the gutter.

7. A carrier element as claimed in claim 5 wherein said means for drawing said clamping element is movable along the said elongated aperture to vary the distance between the said means for drawing said clamping element and the said lower leg of the U-shaped clamp member.

8. A carrier element as claimed in claim 5 wherein the said clamping element has a tab extending from the clamping element to the clamping member to cause the means for drawing the said clamping element to draw the lower portion of the clamping element closer to the clamping member then the upper portion of the clamping element.

9. A carrier element as claimed in claim 5 wherein said means for drawing the said clamping element comprises a threaded bolt passing through the said aperture and a threaded hole in the said clamping member wherein the said bolt engages the threaded hole.

10. A carrier element as claimed in claim 6 wherein the said bracket is L-shaped, the long arm of the L extending upwardly from the said channel portion and the short arm of the L extending from the top of the long arm inwardly towards the automobile, and apertures in each arm of the L whereby the said strapping means extends between the said apertures in the arms of the L.

References Cited by the Examiner

UNITED STATES PATENTS

| | | | |
|---|---|---|---|
| 2,461,897 | 2/1949 | Hopkins | 224—42.45 |
| 2,514,266 | 7/1950 | Walslager. | |
| 2,529,285 | 11/1950 | Felton. | |
| 2,630,256 | 3/1953 | O'Shea. | |
| 2,788,928 | 4/1957 | Des Fosses. | |
| 2,807,398 | 9/1957 | Mathews. | |
| 3,056,570 | 10/1962 | Slaxin. | |

FOREIGN PATENTS 1,084,496   7/1954   France.

GERALD M. FORLENZA, *Primary Examiner.*

HUGO O. SCHULZ, *Examiner.*

J. E. OLDS, *Assistant Examiner.*